United States Patent Office 2,801,216
Patented July 30, 1957

2,801,216

TREATMENT OF WATER WITH DIALDEHYDE BACTERICIDES

Donald M. Yoder, Yonkers, and Dewayne C. Torgeson, Dobbs Ferry, N. Y., assignors to Union Carbide and Carbon Corporation, a corporation of New York No Drawing. Application April 5, 1956,
Serial No. 576,253

6 Claims. (Cl. 210—64)

This invention relates to the treatment of water with bactericides. More particularly, the invention relates to the control of sulfate-reducing bacteria present in water.

Sulfate-reducing bacteria are small rod-shaped, curved or spiral organisms, belonging to the genus Desulfovibrio, which have the ability to accelerate galvanic corrosion. They are abundant in soils of low oxidation potentials, water of many artesian wells, marine muds, water storage tanks and oil wells. In the last category, particularly, sulfate-reducing bacteria have caused serious difficulties during water flooding operations used for the secondary recovery of oil.

Water flooding operations are utilized when the natural formation pressure is lost so that the oil no longer flows from the oil-bearing rock strata. To recover the oil remaining in the strata, water is pumped into the ground at several injection wells around a central producing well, thereby forcing the oil up the pipes of the producing well. The injection waters, in contacting the strata, dissolve sulfates present in the formation. When sulfate-reducing bacteria are also present, they utilize the sulfates in the injection water and form hydrogen sulfide. The hydrogen sulfide formed reacts with any iron present, resulting in deterioration of iron piping and equipment, to form insoluble iron sulfides, which can cause serious plugging of the formation and the oil recovery equipment.

We have discovered a class of dialdehydes which are highly effective bactericides for the control of sulfate-reducing bacteria, and which are particularly suitable for use in the control of sulfate-reducing bacteria in water flooding operations for the secondary recovery of oil.

The dialdehydes contemplated for use in accordance with the present invention are saturated dialdehydes containing from 2 to 6 carbon atoms, inclusive. Representative examples of such dialdehydes are glyoxal, pyruvic aldehyde, malonaldehyde, succinaldehyde, glutaraldehyde and adipaldehyde.

In addition to controlling sulfate-reducing bacteria in secondary recovery operations, the compounds of the present invention may also be used to control sulfate-reducing bacteria in any aqueous medium. Thus, for example, they can be used to prevent corrosion and plugging of iron equipment due to the action of sulfate-reducing bacteria in storage vessels and associated plumbing and equipment.

The compounds of this invention are superior to any known bactericides used in the control of sulfate-reducing bacteria because they possess a unique combination of properties not possessed by any one of the known materials. This combination of properties includes high biological activity; low volatility; water solubility, which makes them easy to handle and easy to introduce into aqueous media containing the bacteria; oil non-solubility, so that they do not enter the oil phase in a well, but remain in the media containing the bacteria; mild odor; and low mammalian toxicity.

The present bactericides can be applied to the aqueous media containing sulfate-reducing bacteria in any suitable manner. For example, in the case of secondary recovery operations, an aqueous solution of one or more of the bactericides can be fed from a drum into the water being introduced into the injection well, in order to provide a continuous supply of bactericides in the circulating system.

The present compounds may be used in an amount as little as 1 part per million of total aqueous medium being treated, but are preferably used in the range of 10 to 50 parts per million, depending on the number of Desulfovibrio present and the nature of the medium being treated.

The experiments, summarized in Table I, illustrate the present invention. The experiments were conducted using a sterile medium prepared by admixing 1.0 gram of ammonium chloride, 2.0 grams of magnesium sulfate, 0.44 gram of sodium sulfate, 0.5 gram of potassium hydrophosphate, 0.1 gram of calcium chloride, 3.5 grams of sodium lactate, 5 grams of yeast extract and 500 milliliters of water and heating the mixture in an autoclave, operated at a temperature in the range of 118 to 120° C., for a period of 20 minutes. The sterile medium was then inoculated with an actively growing culture of *Desulfovibrio desulfuricans* of culture per 100 milliliters of medium. Twenty milliliters portions of the inoculated medium were each mixed with an equal volume of double strength aqueous solution of the compounds listed in Table I to give resulting mixtures having the concentrations shown in Table I. Each such mixture was added to a 30 milliliter screw cap vial to the point of overflow after which a few crystals of $FeSO_4$ were added. Each vial was capped and held in an incubator at a temperature of 30° C. for 30 days. At the end of 30 days, each vial was observed for Desulfovibrio activity, which is detected by the presence of a black iron sulfide precipitate. The precipitate is formed by the reaction of $FeSO_4$ and $H_2S$ and thus indicates that $H_2S$ was formed due to Desulfovibrio activity. This method of testing is similar to the tentative procedure recommended by the American Petroleum Institute Committee, which is investigating bactericides for secondary recovery. In Table I, for each test, the presence of black iron sulfide is indicated by a plus (+) sign and the absence by a zero (0).

*Table I*

| Compound | Bactericidal Activity (as indicated by iron sulfide precipitate) | | | |
| --- | --- | --- | --- | --- |
|  | Concentration of Compound in Parts Per Million | | | |
|  | 1,000 | 100 | 10 | 1 |
| Glyoxal | 0 | 0 | + | + |
| Glutaraldehyde | 0 | 0 | 0 | + |

It can be seen from Table I that the compounds of the present invention effectively inhibit Desulfovibrio activity.

We claim:

1. The method of controlling sulfate-reducing bacteria in water, which comprises introducing into said water an effective amount of a saturated dialdehyde containing from 2 to 6 carbon atoms, inclusive.

2. The method of controlling sulfate-reducing bacteria in water, which comprises introducing into said water an effective amount of glutaraldehyde.

3. The method of controlling sulfate-reducing bacteria in water, which comprises introducing into said water an effective amount of glyoxal.

4. The method of controlling sulfate-reducing bacteria during a secondary recovery operation in an oil well, wherein water is introduced into a well, which comprises introducing into said water an effective amount of a saturated dialdehyde containing from 2 to 6 carbon atoms, inclusive.

5. The method of controlling sulfate-reducing bacteria during a secondary recovery operation in an oil well, wherein water is introduced into a well, which comprises introducing into said water an effective amount of glutaraldehyde.

6. The method of controlling sulfate-reducing bacteria during a secondary recovery operation in an oil well, wherein water is introduced into a well, which comprises introducing into said water an effective amount of glyoxal.

References Cited in the file of this patent

UNITED STATES PATENTS

| 2,333,182 | Jones | Nov. 2, 1943 |
| 2,363,924 | Denman | Nov. 28, 1944 |

OTHER REFERENCES

Vollrath et al.: "Bactericidal Properties of Acrolein," 36 Proc. Soc. Exp. Biol. and Med. 55–58 (1937).